(12) United States Patent
Kakinuma et al.

(10) Patent No.: US 10,809,823 B2
(45) Date of Patent: Oct. 20, 2020

(54) INPUT SYSTEM

(71) Applicant: TOYOTA JIDOSHA KABUSHIKI KAISHA, Toyota-shi, Aichi-ken (JP)

(72) Inventors: Shoji Kakinuma, Okazaki (JP); Koshi Ito, Okazaki (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/049,673

(22) Filed: Jul. 30, 2018

(65) Prior Publication Data
US 2019/0121457 A1 Apr. 25, 2019

(30) Foreign Application Priority Data
Oct. 25, 2017 (JP) .................................. 2017-206055

(51) Int. Cl.
*G06F 3/0354* (2013.01)
*B60K 35/00* (2006.01)
*G06F 3/038* (2013.01)

(52) U.S. Cl.
CPC .......... *G06F 3/03547* (2013.01); *B60K 35/00* (2013.01); *G06F 3/038* (2013.01); *G06F 2203/0382* (2013.01)

(58) Field of Classification Search
CPC ................. G06F 3/03547; G06F 3/038; G06F 2203/0382; B60K 35/00; B60K 2370/197; B60K 37/06; B60K 2370/1434
See application file for complete search history.

(56) References Cited

U.S. PATENT DOCUMENTS

| 2007/0049358 | A1* | 3/2007 | Kang | H04M 1/0214 |
| | | | | 455/575.1 |
| 2008/0048986 | A1* | 2/2008 | Khoo | G06F 1/1615 |
| | | | | 345/168 |
| 2013/0007653 | A1* | 1/2013 | Stolyarov | G06F 1/1626 |
| | | | | 715/784 |
| 2014/0098050 | A1* | 4/2014 | Endo | G06F 3/0487 |
| | | | | 345/173 |
| 2017/0102810 | A1* | 4/2017 | Satake | G06F 1/1626 |

FOREIGN PATENT DOCUMENTS

JP 2001-306246 A 11/2001

* cited by examiner

*Primary Examiner* — Abhishek Sarma
(74) *Attorney, Agent, or Firm* — Hunton Andrews Kurth LLP

(57) ABSTRACT

An input system includes a first touch input unit on which a touch operation is performed; a second touch input unit on which a touch operation is performed; and a processing unit configured to control display of a display unit using operation information that is acquired from any one touch input unit of the first touch input unit and the second touch input unit. The processing unit does not use operation information from an other touch input unit of the first touch input unit and the second touch input unit in display control for the display unit until a non-input time of the one touch input unit exceeds a first predetermined cancellation time, the non-input time of the one touch input unit being a time during which there is no input to the one touch input unit.

6 Claims, 3 Drawing Sheets

INPUT SYSTEM

INCORPORATION BY REFERENCE

The disclosure of Japanese Patent Application No. 2017-206055 filed on Oct. 25, 2017 including the specification, drawings and abstract is incorporated herein by reference in its entirety.

BACKGROUND

1. Technical Field

The disclosure relates to an input system that controls display of a display unit using operation information which is input to a first touch input unit and a second touch input unit.

2. Description of Related Art

Japanese Unexamined Patent Application Publication No. 2001-306246 (JP 2001-306246 A) describes a mobile terminal device in which a keyboard and a touch pad including a pad portion and a button portion are provided. A touch pad control unit of the mobile terminal device sends an input signal from the pad portion to a mouse controller when the button portion is in a half-pressed state or in a fully-pressed state, and does not send an input signal from the pad portion to the mouse controller when the button portion is not pressed. That is, when a user is performing input on the keyboard, the button portion is not pressed and an input to the touch pad is dismissed.

SUMMARY

The technique described in JP 2001-306246 A is based on the premise that both of an input to the touch pad and an input to the keyboard are valid in a state in which the button portion is pressed and one user cannot perform input on the touch pad while performing input on the keyboard. For example, when two users perform input on the touch pad and the keyboard, respectively, it is not determined which input has priority.

The disclosure provides a technique of preventing inputs from being mixed when two touch input units receive the inputs, respectively.

An aspect of the disclosure relates to an input system including a first touch input unit on which a touch operation is performed; a second touch input unit on which a touch operation is performed; and a processing unit configured to control display of a display unit using operation information that is acquired from any one touch input unit of the first touch input unit and the second touch input unit. The processing unit does not use operation information from an other touch input unit of the first touch input unit and the second touch input unit in display control for the display unit until a non-input time of the one touch input unit exceeds a first predetermined cancellation time, the non-input time of the one touch input unit being a time during which there is no input to the one touch input unit.

According to this aspect, the operation information from the other touch input unit is not used in the display control for the display unit until the non-input time of the one touch input unit exceeds the first predetermined cancellation time. Thus, when the first touch input unit and the second touch input unit receive inputs, respectively, it is possible to prevent the inputs from being mixed.

In the above-described aspect, when the non-input time of the one touch input unit exceeds the first predetermined cancellation time in a case where an input to the one touch input unit is preferentially used, both the touch input units may be reset to a state where inputs to both the touch input units can be used. When one touch input unit receives an input earlier than the other touch input unit in a state where inputs to both the touch input units can be used, the input to the one touch input unit may be preferentially used, and an input to the other touch input unit may not be used. With this configuration, it is possible to prevent the inputs to both the touch input units from being mixed.

In the above-described aspect, when a predetermined cancellation operation is performed on the other touch input unit in a case where the operation information from the other touch input unit is not used in the display control for the display unit, the processing unit may be enabled to use the operation information from the other touch input unit in the display control for the display unit. With this configuration, the other touch input unit can cancel a priority of the one touch input unit, and it is possible to start to use an input to the other touch input unit.

In the above-described aspect, the first touch input unit may be disposed away from the display unit; the second touch input unit may be superimposed on the display unit; and the processing unit may be configured to i) use the operation information from the first touch input unit as information for moving a cursor when the display of the display unit is controlled using the operation information from the first touch input unit, ii) hide the cursor and use the operation information from the second touch input unit as information for designating a position on the display unit when the display of the display unit is controlled using the operation information from the second touch input unit, and iii) display the cursor at a predetermined position when the processing unit receives the operation information from the first touch input unit for the display control for the display unit in a state in which the cursor is hidden. With this configuration, a user can determine which touch input unit has priority in accordance with whether the cursor is displayed. Further, the cursor is displayed at an initial position when an input to the first touch input unit starts to be used, the user can easily recognize the position of the cursor.

In the above-described aspect, the processing unit may be configured not to use the operation information from the first touch input unit in the display control for the display unit until a non-input time of the second touch input unit exceeds a second predetermined cancellation time in a case where the display of the display unit is controlled using the operation information from the second touch input unit, the non-input time of the second touch input unit being a time during which there is no input to the second touch input unit; and the processing unit may be configured to be able to use the operation information from the second touch input unit in the display control for the display unit regardless of the non-input time of the first touch input unit in a case where the display of the display unit is controlled using the operation information acquired from the first touch input unit. With this configuration, when an unintentional operation is performed on the first touch input unit while the second touch input unit is being operated, unintentional operation can be limited.

According to the aspect of the disclosure, it is possible to provide a technique of preventing inputs from being mixed when two touch input units receive the inputs, respectively.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
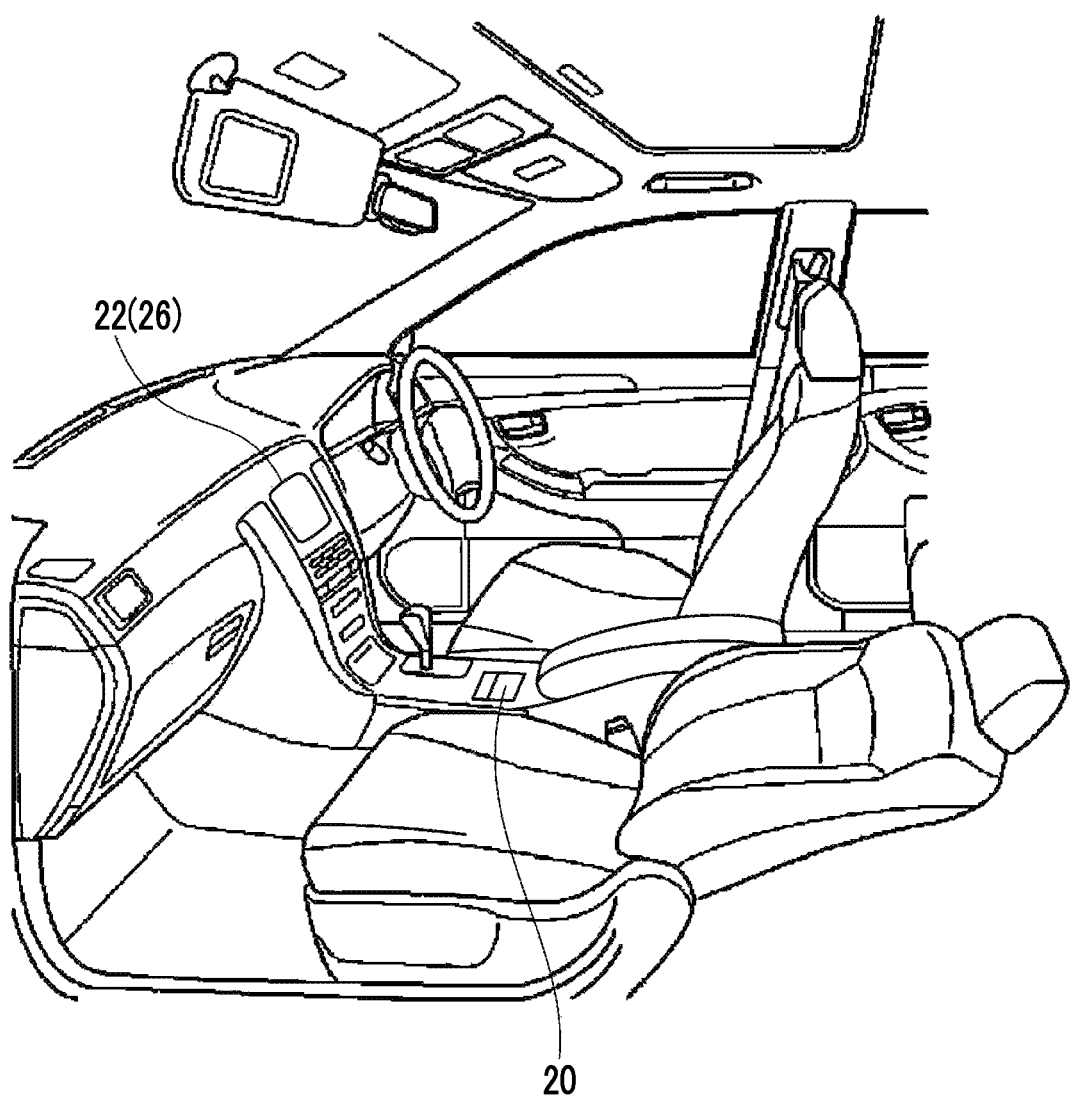
FIG. 1 is a diagram illustrating a first touch input unit and a second touch input unit which are provided in a vehicle.

FIG. 1 is a diagram illustrating a first touch input unit 20 and a second touch input unit 22 which are provided in a vehicle. In FIG. 1, a passenger seat is inclined so that the first touch input unit 20 is easily visible. The first touch input unit 20 is disposed in a center console between a driver seat and a passenger seat. The first touch input unit 20 is a touchpad type input device to which a user's touch operation is input.

The first touch input unit 20 outputs an input signal based on a touch operation to a control unit which is not illustrated, and an image is displayed on a display unit 26 by the control unit. A mechanical switch such as a menu button for calling a menu image or a back button for returning to a previous image may be provided in the first touch input unit 20.

The second touch input unit 22 is a touchpad type touch screen to which a user's touch operation is input and is disposed on the display unit 26. That is, the second touch input unit 22 is located on the surface of the display unit 26. The second touch input unit 22 is operated by a touch on a screen of the display unit 26, that is, a touch operation is performed on the screen of the display unit 26. The display unit 26 is disposed in a dashboard located at a position away from the first touch input unit 20 and displays a menu image, an image based on an onboard function (i.e., an in-vehicle function), or the like. The second touch input unit 22 (the display unit 26) is disposed ahead of the first touch input unit 20 in a vehicle front-rear direction at a higher position than the position of the first touch input unit 20 so that an occupant can easily see the second touch input unit 22.

A driver puts a wrist on the center console and inputs a touch operation, for example, a slide operation or a tap operation, to the first touch input unit 20 to select an onboard function while watching the display unit 26. On the other hand, a user in a passenger seat inputs a touch operation to the second touch input unit 22. When an operation on the first touch input unit 20 and an operation on the second touch input unit 22 are performed at the same time, the control unit gives a priority to one input and dismisses the other input so as to avoid a situation in which two inputs are mixed and it is not clear which input should be performed.

Figure 2:
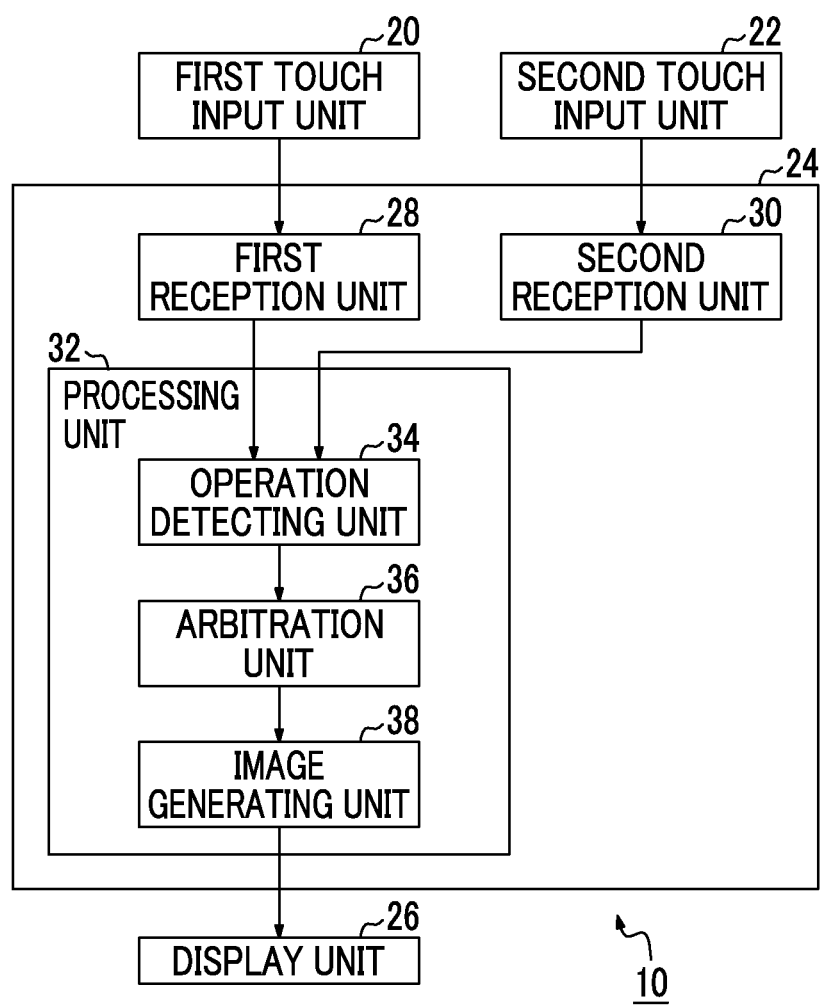
FIG. 2 is a diagram illustrating a functional configuration of an input system according to an embodiment of the disclosure.

FIG. 2 is a diagram illustrating a functional configuration of an input system 10 according to an embodiment. In FIG. 2, each of elements which are illustrated as functional blocks configured to perform various processes can be formed with the use of a circuit block, a memory, and another Large Scale Integrated Circuit (LSI) in hardware and can be implemented by a program loaded into the memory or the like in software. Accordingly, it can be easily understood by those skilled in the art that these functional blocks may be implemented in various forms with the use of only hardware, only software, or a combination thereof, and the disclosure is not limited to only one thereof.

The input system 10 includes a first touch input unit 20, a second touch input unit 22, a control unit 24, and a display unit 26. The control unit 24 controls display of the display unit 26 based on operation information which is output from the first touch input unit 20 and the second touch input unit 22.

The control unit 24 includes a first reception unit 28, a second reception unit 30, and a processing unit 32. The first reception unit 28 receives operation information input to the first touch input unit 20. The second reception unit 30 receives operation information input to the second touch input unit 22.

The operation information output from the first touch input unit 20 and the second touch input unit 22 includes coordinate information indicating an input position of a touch operation and input information of the mechanical switch. The input position of the first touch input unit 20 is converted into, for example, coordinate information in which an input start point is set as a zero point, a vehicle front-rear direction is set as an up-down direction, and a vehicle width direction is set as a right-left direction. The input position of the second touch input unit 22 becomes coordinate information in the up-down direction and the right-left direction without any change. The processing unit 32 controls display of the display unit 26 using the operation information which is acquired from any one (any one touch input unit) of the first touch input unit 20 and the second touch input unit 22.

The processing unit 32 includes an operation detecting unit 34, an arbitration unit 36, and an image generating unit 38. The operation detecting unit 34 determines a kind of an operation based on a locus between an input start point and an input end point which are indicated by the operation information received by the first reception unit 28 and the second reception unit 30, and detects a slide direction when the kind of operation is a slide operation. Examples of the kind of the operation include a slide operation, a tap operation, a pinch operation, and a long-pressing operation.

The arbitration unit 36 determines that operation information from one (one touch input unit) of the first touch input unit 20 and the second touch input unit 22 should be used in the display control for the display unit 26, and determines that the operation information from the other touch input unit should not be used in the display control for the display unit 26.

The arbitration unit 36 gives a priority to one of the first touch input unit 20 and the second touch input unit 22 (which are referred to as "touch input units" when they do not need to be distinguished from each other) so as to give a priority to the input to the one of the touch input units. The arbitration unit 36 determines that the operation information from one touch input unit having the priority should be used in the display control for the display unit 26, and determines that the operation information from the other touch input unit that does not have the priority should not be used in the display control of the display unit 26. Accordingly, an input to one touch input unit having the priority can be continuously used without being hindered (disturbed) by an input to the other touch input unit. A state in which the operation information from one touch input unit is used in the display control for the display unit 26 is a state in which a priority has been given to the one touch input unit.

In a case where the operation information from one of the first touch input unit 20 and the second touch input unit 22 is used, the arbitration unit 36 does not use the operation information from the other touch input unit in the display control for the display unit 26 until a non-input time of one touch input unit (i.e., a time during which there is no input to one touch input unit) exceeds a predetermined cancellation time (a first predetermined cancellation time according to the disclosure). That is, in the case where a priority is given to one touch input unit, the one touch input unit has the priority until the non-input time during which a non-input state (i.e., a state in which there is no input) is maintained reaches the predetermined cancellation time, and the priority is canceled when the non-input time during which the non-input state is maintained exceeds the predetermined cancellation time. Accordingly, since a priority of a touch input unit is automatically canceled when the predetermined cancellation time elapses in the non-input state, both the touch input units can be reset to a state in which inputs to both the touch input units can be used. The predetermined cancellation time may be set to a time, for example, in a range of 2 seconds to 10 seconds.

In a state in which a priority of a touch input unit has been canceled due to the elapse of the predetermined cancellation time, a priority is not given to any touch input unit, and a priority is given to one touch input unit that receives an input earlier than the other touch input unit (i.e., a priority is given to one touch input unit on which input is performed earlier). Accordingly, one touch input unit, which receives an input earlier in a state in which inputs to both the touch input units can be used, has a priority and the input to the one touch input unit can be continuously used without being hindered (disturbed) by an input to the other touch input unit.

The arbitration unit 36 may adjust the predetermined cancellation time depending on whether the vehicle is traveling. For example, when the vehicle is traveling, the predetermined cancellation time may be set to be longer than that when the vehicle is stopped. The predetermined cancellation time (the first predetermined cancellation time according to the disclosure) of the first touch input unit 20 may be set to be longer than a predetermined cancellation time (a second predetermined cancellation time according to the disclosure) of the second touch input unit 22. Accordingly, the priority of the first touch input unit 20 is secured for a longer time, and a driver who mainly uses the first touch input unit 20 can operate the first touch input unit 20 without hurrying (without feeling rushed). The predetermined cancellation time of the second touch input unit 22 may be set to be longer than the predetermined cancellation time of the first touch input unit 20.

When a predetermined cancellation operation is performed on the other touch input unit in a case where the operation information from the other touch input unit is not used in the display control for the display unit 26, the arbitration unit 36 determines that the operation information from the other touch input unit should be used. That is, when the predetermined cancellation operation is performed on the other touch input unit in a state in which a priority has been given to one touch input unit, the arbitration unit 36 cancels the priority of the one touch input unit, and gives a priority to the other touch input unit so as to allow an input to the other touch input unit to be used. The predetermined cancellation operation may be set to, for example, a slide operation from one end of a touch area of the touch input unit to the other end or a double-tap operation with two or more fingers. Accordingly, the other touch input unit that does not have a priority can cancel the priority of the one touch input unit, and thus, it is possible to start to use an input to the other touch input unit.

In the embodiment, each of the first touch input unit 20 and the second touch input unit 22 can perform a priority cancellation operation. However, the disclosure is not limited to this mode. For example, it may be possible to set a mode in which one of the first touch input unit 20 and the second touch input unit 22 can perform a priority cancellation operation, and the other touch input unit cannot perform a priority cancellation operation. For example, it may be possible to set a mode in which the first touch input unit 20 can perform a priority cancellation operation, and the second touch input unit 22 cannot perform a priority cancellation operation. In this mode, the priority of the first touch input unit 20 cannot be canceled, and thus, an input to the first touch input unit 20, which is mainly used by a driver, can be preferentially used.

The arbitration unit 36 may determine that the operation information from one touch input unit should be used and the operation information from the other touch input unit should not be used in the display control for the display unit 26 in a state in which the vehicle is traveling, and may determine that the operation information from both touch input units may be used in a state in which the vehicle is not traveling. That is, the arbitration unit 36 performs arbitration regarding the operation information only during traveling of the vehicle, and does not perform arbitration when the vehicle is stopped.

The image generating unit 38 generates an image of an onboard function in response to an input to the first touch input unit 20 and the second touch input unit 22, that is, based on the detection result from the operation detecting unit 34 and the arbitration result from the arbitration unit 36. The image generating unit 38 extracts an image corresponding to the onboard function from a memory which is not illustrated, generates an image in which a cursor overlaps the extracted image, and displays the generated image on the display unit 26.

The image generating unit 38 determines a location of a cursor, that is, positional coordinates of the cursor on the screen, based on the operation information received by the first reception unit 28 and displays the cursor on the display unit 26. The image generating unit 38 displays the cursor such that the cursor moves on the screen of the display unit 26 in response to a slide operation on the first touch input unit 20. The image generating unit 38 may convert an amount of slide operation on the first touch input unit 20 into an amount of movement of the cursor on the display unit 26 at a predetermined aspect ratio. When an image is generated using the operation information received by the second reception unit 30, the image generating unit 38 does not display the cursor.

When the operation information from the second touch input unit 22 is used, the image generating unit 38 hides the cursor on the display unit 26 (i.e., the image generating unit 38 brings the cursor to a hidden state). When the operation information from the first touch input unit 20 is used in a state in which the cursor is in the hidden state, the image generating unit 38 displays the cursor at a predetermined initial position again and displays the cursor such that the cursor moves from the predetermined initial position. That is, the cursor is displayed only when an input to the first touch input unit 20 can be used. The cursor is displayed, for example, at an initial position at the center of the display unit 26 at the initial input time when a priority is given to the first touch input unit 20. When the cursor is being displayed, it is indicated that the operation information from the first touch input unit 20 is used. When the cursor is not displayed, it is indicated that the operation information from the second touch input unit 22 is used. That is, a user can determine which touch input unit has priority in accordance with whether the cursor is displayed or not.

Figure 3:
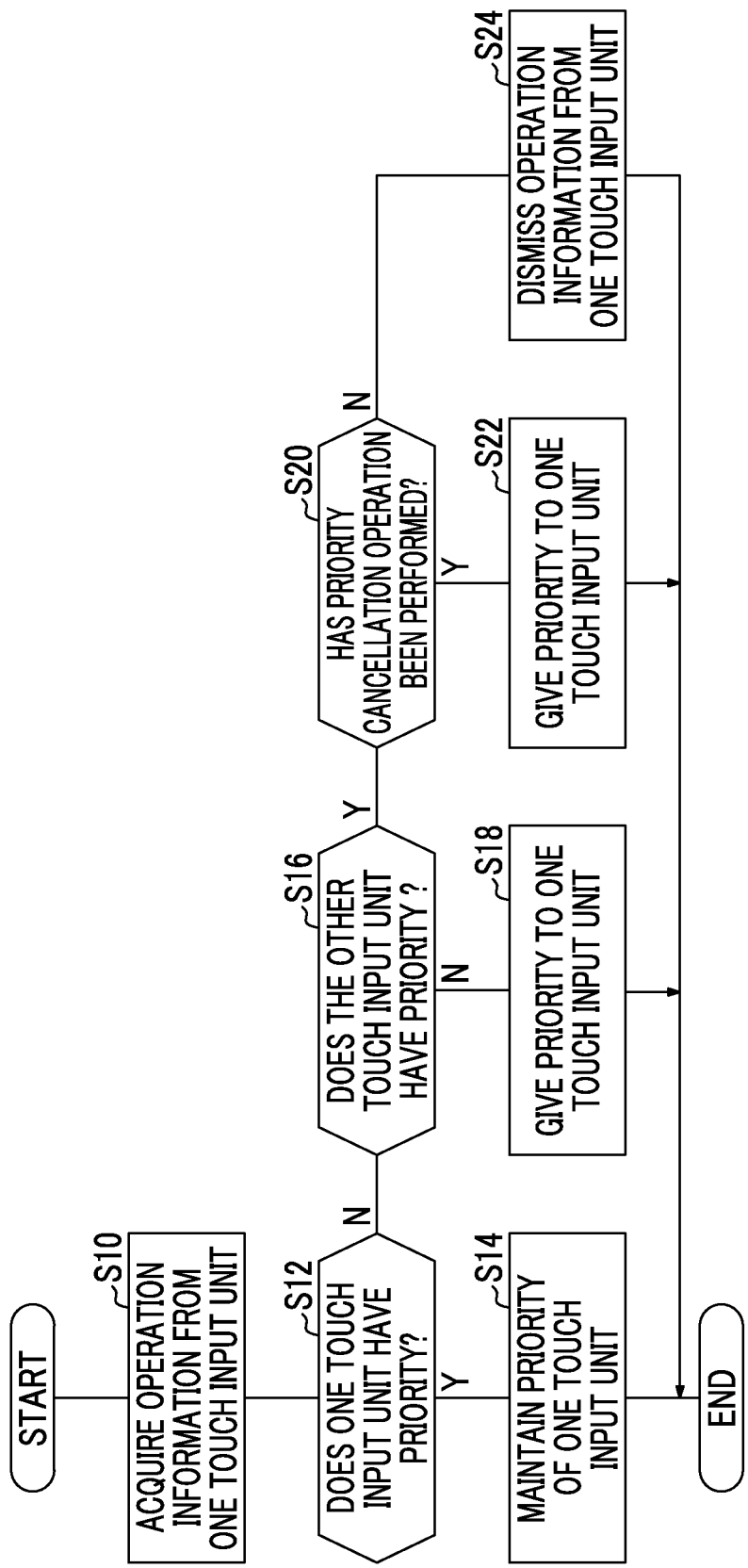
FIG. 3 is a flowchart illustrating a process routine of giving a priority to a touch input unit.

FIG. 3 is a flowchart illustrating a process routine of giving a priority to one touch input unit. The operation detecting unit 34 acquires operation information received by one of the first reception unit 28 and the second reception unit 30 (S10) and detects an operation input to the one touch input unit. The arbitration unit 36 determines whether the one touch input unit has a priority (S12). When the one touch input unit has a priority (Y in S12), the arbitration unit 36 continues to maintain the priority of the one touch input unit (S14).

When the one touch input unit does not have a priority (N in S12), the arbitration unit 36 determines whether the other touch input unit has a priority (S16). When the other touch input unit does not have a priority (N in S16), neither of the touch input units has a priority and thus the arbitration unit 36 gives a priority to the one touch input unit that received the input earlier than the other touch input unit (S18).

When the other touch input unit has a priority (Y in S16), the arbitration unit 36 determines whether the operation input to the one touch input unit and detected by the operation detecting unit 34 is a priority cancellation operation (S20). When the operation input to the one touch input unit is a priority cancellation operation (Y in S20), the arbitration unit 36 cancels the priority given to the other touch input unit and gives a priority to the one touch input unit (S22).

When the operation input to the one touch input unit is not a priority cancellation operation (N in S20), the arbitration unit 36 does not use the operation information from the one touch input unit, and dismisses the operation information from the one touch input unit (S24). In this way, any one touch input unit has a priority, and the image generating unit 38 generates an image using the operation information from the touch input unit having a priority and does not use the operation information from the touch input unit that does not have a priority.

The embodiment is only an example, and it will be understood by those skilled in the art that the combination of the elements can be modified in various forms and such modified examples are included in the scope of the disclosure.

In the embodiment, a priority is given to one of the first touch input unit 20 and the second touch input unit 22, which receives an input earlier than the other. However, the disclosure is not limited to this mode. For example, when the second touch input unit 22 receives an input (i.e., when input is performed on the second touch input unit 22) in a case where the first touch input unit 20 has a priority, the priority of the first touch input unit 20 may be transferred to the second touch input unit 22 and the operation information from the second touch input unit 22 may be used.

That is, in a case where the operation information from the second touch input unit 22 is used, the processing unit 32 does not use the operation information from the first touch input unit 20 in the display control for the display unit 26 until the non-input time of the second touch input unit 22 (i.e., the time during which there is no input to the second touch input unit 22) exceeds the predetermined cancellation time. When the second reception unit 30 receives the operation information (i.e., when the second touch input unit 22 receives an input) in a case where the operation information from the first touch input unit 20 is used, the processing unit 32 gives a priority to the second touch input unit 22 and uses the operation information from the second touch input unit 22 regardless of the non-input time of the first touch input unit 20, even if the operation information from the first touch input unit 20 can be used. The second touch input unit 22 is disposed at a position that can be easily seen by a driver and an occupant in a passenger seat. Therefore, an operation on the second touch input unit 22 is often performed with agreement between the driver and the occupant in the passenger seat, and thus, a priority can be preferentially given to the second touch input unit 22 in this modified example.

One touch input unit having a priority may be operable, and the other touch input unit that does not have a priority may be inoperable. One reception unit corresponding to one touch input unit having a priority may receive operation information from the one touch input unit, and the other reception unit corresponding to the other touch input unit that does not have a priority may not receive operation information from the other touch input unit.

What is claimed is:

1. An input system comprising:
   a display unit;
   a first touch input unit on which a touch operation is performed and displayed on the display unit;
   a second touch input unit on which a touch operation is performed and displayed on the display unit; and
   a control unit comprising a circuit block and memory, the control unit programmed to control a display of the display unit using operation information that is acquired from any one touch input unit of the first touch input unit and the second touch input unit,
   wherein in a state in which the operation information from one touch input unit of the first touch input unit and the second touch input unit is used in the display of the display unit is a state in which the control unit gives a priority to the one touch input unit of the first touch input unit and the second touch input unit, and
   the control unit is configured to control a arbitration unit so that the arbitration unit does not use the operation information from the other touch input unit of the first touch input unit and the second touch input unit in the display of the display unit until a non-input time of the one touch input unit of the first touch input unit and the second touch input unit exceeds a first predetermined cancellation time, the non-input time is a time during which there is no input to the one touch input unit of the first touch input unit and the second touch input unit.

2. The input system according to claim 1, wherein when a predetermined cancellation operation is performed on the other touch input unit in a case where the operation information from the other touch input unit is not used in the display control for the display unit, the control unit is enabled to use the operation information from the other touch input unit in the display control for the display unit.

3. The input system according to claim 1, wherein
   the first touch input unit is disposed away from the display unit;
   the second touch input unit is superimposed on the display unit; and
   the control unit is further configured to i) use the operation information from the first touch input unit as information for moving a cursor when the display of the display unit is controlled using the operation information from the first touch input unit, ii) hide the cursor and use the operation information from the second touch input unit as information for designating a position on the display unit when the display of the display unit is controlled using the operation information from the second touch input unit, and iii) display the cursor at a predetermined position when the control unit receives the operation information from the first touch input unit for the display control for the display unit in a state in which the cursor is hidden.

4. The input system according to claim 1, wherein the control unit is further configured not to use the operation information from the first touch input unit in the display control for the display unit until a non-input time of the second touch input unit exceeds a second predetermined cancellation time in a case where the display of the display unit is controlled using the operation information from the second touch input unit, the non-input time of the second touch input unit being a time during which there is no input to the second touch input unit; and the control unit is further configured to be able to use the operation information from the second touch input unit in the display control for the display unit regardless of the non-input time of the first touch input unit in a case where the display of the display unit is controlled using the operation information acquired from the first touch input unit.

5. The input system according to claim 4, wherein the control unit is further configured to use the operation information from the second touch input unit in the display control for the display unit regardless of the non-input time of the first touch input unit when the second touch input unit receives an input in the case where the display of the display unit is controlled using the operation information acquired from the first touch input unit.

6. The input system according to claim 1, wherein in a state where the control unit does not use the operation information from the other touch input unit of the first touch input unit and the second touch input unit in the display of the display unit, the control unit uses the operation information from the other touch input unit of the first touch input unit and the second touch input unit in the display of the display unit when a predetermined cancellation operation is performed on the other touch input unit of the first touch input unit and the second touch input unit.

\* \* \* \* \*